(12) United States Patent
Sloane et al.

(10) Patent No.: US 11,240,636 B1
(45) Date of Patent: Feb. 1, 2022

(54) DIGITAL PASSPORT WITH VERIFIED DATA PROVENANCE

(71) Applicant: Bank of America Corporation, Charlotte, NC (US)

(72) Inventors: Brandon Sloane, Charlotte, NC (US); Aarron Gull, Commack, NY (US); Harvey Summers, Richmond, VA (US); Gilbert Gatchalian, Union, NJ (US); Vijaya L. Vemireddy, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 55 days.

(21) Appl. No.: 16/940,503

(22) Filed: Jul. 28, 2020

(51) Int. Cl.
| | | |
|---|---|---|
| *H04W 4/029* | (2018.01) | |
| *H04L 9/06* | (2006.01) | |
| *G06Q 20/40* | (2012.01) | |
| *G06Q 20/32* | (2012.01) | |
| *G06F 16/29* | (2019.01) | |

(52) U.S. Cl.
CPC ............ *H04W 4/029* (2018.02); *G06F 16/29* (2019.01); *G06Q 20/3224* (2013.01); *G06Q 20/4093* (2013.01); *H04L 9/0637* (2013.01); *H04L 9/0643* (2013.01)

(58) Field of Classification Search
CPC ....... H04W 4/027; H04W 4/02; H04W 12/02; H04W 12/12; H04W 64/00; G06Q 20/4016; G06Q 50/01; G06Q 40/02; G06Q 40/08; G06Q 20/4014; G06Q 10/0635; G06Q 20/401
See application file for complete search history.

(56) References Cited

U.S. PATENT DOCUMENTS

| | | | | |
|---|---|---|---|---|
| 10,389,715 | B1 * | 8/2019 | Douglas ............... | H04L 63/107 |
| 11,080,423 | B1 * | 8/2021 | Kassam-Adams ........................... G06F 21/6254 | |
| 11,164,269 | B1 * | 11/2021 | Locke .................... | G16H 50/30 |
| 11,172,467 | B2 * | 11/2021 | Rubin .................. | H04W 52/04 |

(Continued)

OTHER PUBLICATIONS

"The Known Traveller: Unlocking the Potential of Digital Identity for Secure and Seamless Travel," http://www3.weforum.org/docs/WEF_The_Known_Traveller_Digital_Identity_Concept.pdf, World Economic Forum, Jan. 2018.

(Continued)

*Primary Examiner* — Dung Hong
(74) *Attorney, Agent, or Firm* — Weiss & Arons LLP (57) ABSTRACT

Systems and methods for accurately and securely assembling, storing, and leveraging travel data are provided. A method may include detecting a travel event of a user. The method may include recording the travel event in a travel map that is stored in a database. The travel map may be a temporal- and spatial-based record of one or more travel events of the user. The travel map may be stored as a blockchain ledger. The method may include tokenizing sensitive information associated with the user in the database, and calculating a hazard vector. The method may include updating, based at least in part on the hazard vector, a status index associated with the user, and providing the user and a system administrator access to the travel map and the status index. Access may be provided via an online portal configured to be viewed via an application running on a mobile device.

20 Claims, 5 Drawing Sheets

(56) References Cited

U.S. PATENT DOCUMENTS

| | | | | |
|---|---|---|---|---|
| 2013/0035945 A1* | 2/2013 | Beville, III | ............ | G06Q 10/10 |
| | | | | 705/2 |
| 2014/0266701 A1* | 9/2014 | Mittal | .................... | G08B 21/02 |
| | | | | 340/539.13 |
| 2015/0206166 A1* | 7/2015 | Fletcher | ................. | G06Q 10/06 |
| | | | | 705/14.27 |
| 2018/0041492 A1* | 2/2018 | Jacobs | ................ | H04L 63/0876 |
| 2019/0378036 A1* | 12/2019 | Tuzi | ....................... | G06N 7/005 |
| 2020/0294016 A1* | 9/2020 | Jiang | ....................... | H04L 67/12 |
| 2020/0311736 A1* | 10/2020 | Song | ................. | G06Q 20/0855 |
| 2021/0234668 A1* | 7/2021 | Manamohan | ......... | H04L 9/3239 |
| 2021/0326815 A1* | 10/2021 | Brody | ................. | G06F 16/2379 |
| 2021/0326901 A1* | 10/2021 | Daley | ................. | G06Q 50/265 |

OTHER PUBLICATIONS

"Travel Identity of the Future," https://www.sita.aero/resources/type/white-papers/travel-identity-of-the-future, SITA, 2016.

* cited by examiner

DIGITAL PASSPORT WITH VERIFIED DATA PROVENANCE

FIELD OF TECHNOLOGY

Aspects of the disclosure relate to digital systems. Specifically, aspects of the disclosure relate to secure digital systems with increased data accuracy.

BACKGROUND OF THE DISCLOSURE

Traveling may expose a traveler to hazards. Being exposed to the hazards may present a danger to the traveler. Being exposed to the hazards may present a danger to other parties aside from the traveler. The traveler and the other parties may be unaware of the exposure. The traveler and the other parties may be unaware of the danger presented by the exposure.

Travel data may include travelling patterns associated with travelers. Travel data, however, is often inaccurate and not comprehensive. For example, a traveler may travel on one itinerary using one passport and a second itinerary using a second passport. Travel data based on one passport will be incomplete. As another example, an itinerary may indicate that a traveler traveled from a first country to a second country. However, the traveler may, in fact, have originated his or her travel in a third country. Travel data, therefore, may lack important information.

It would be desirable, therefore, to provide computer-based systems and methods for accurately and efficiently assembling and storing travel data. It would be further desirable to leverage the travel data and provide a distributed, digital early warning network that increases the safety and security of travelers as well as those exposed to travelers.

SUMMARY OF THE DISCLOSURE

Aspects of the disclosure relate to systems and methods with increased accuracy and security for assembling, storing, and leveraging travel data. A system may include a processor, a database configured to store the travel data, and a non-transitory memory storing computer executable instructions, that when run on the processor, are configured to provide system functionality.

The system may be configured to detect a travel event of a user. A travel event may include a transition of the user from a first location to a second location. The system may be configured to record the travel event in a travel map that is stored in the database. The travel map may include a temporal-based and spatial-based record of one or more travel events of the user. The travel map may be stored as a blockchain ledger, and each travel event of the travel map may be recorded as a separate data block of the blockchain ledger.

The system may be configured to calculate, based at least in part on data associated with the first location and the second location, a hazard vector. The system may be configured to update, based at least in part on the hazard vector, a status index associated with the user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Aspects of the disclosure relate to systems and methods with increased accuracy and security for assembling, storing, and leveraging travel data. A system is provided which may include a processor, a database configured to store the travel data, and a non-transitory memory storing computer executable instructions, that when run on the processor, may be configured to provide at least a portion of system functionality.

The system may be configured to detect a travel event of a user. A travel event may include a transition of the user from a first location to a second location. The locations may be two locations, such as countries, that typically log travel between them using travel documents such as passports. The locations may be any two areas with distinct classifications or identifiers. Locations may include states, cities, counties, zip codes, addresses, buildings, vehicles, global positioning system (GPS) coordinates, or any other suitable location.

A travel event may also, in certain embodiments, include an event in which the first and second locations of the user may be the same location. The first and second locations may differ with respect to a hazard differential. For example, the event may include a scenario wherein a separate entity moves location relative to the user, and increases or decreases an exposure to the user.

Detecting the travel events, may, in certain embodiments, be based on one or more input elements. An illustrative input element may include a message transmitted by the user to the system reporting a travel event. An illustrative input element may include a global positioning system (GPS) tracking system. The GPS system may be part of a mobile device associated with the user. Other input elements may include spending records of a payment instrument associated with the user, and passage of the user at a point of entry to a location.

For example, in one illustrative embodiment, the system may include an application ("app") accessible on a mobile device of the user. The app may be customizable by the user. For example, the user may opt-in via the app to record a travel event when the user travels from one location to another, such as from one zip code or city to another. This option may use a GPS system of the mobile device. The user may, in certain embodiments, select an option which does not automatically record all travel events, rather allows the user to manually input a travel event. The app may, in some embodiments, be configured to piggyback on other apps on the mobile device. For example, the app may detect when a ride-share, hotel, or air travel app on the device is facilitating travel. The app may leverage the travel information from those other apps in detecting travel events.

The system may be configured to record the travel event in a travel map that may be stored in the database. The travel map may include a temporal-based and/or spatial-based record of one or more travel events of the user. The travel map may include any suitable data structure or layout for the travel data. Illustrative data structures and layouts may include lists, maps, graphs and trees. For example, in a display on a computing device, the travel map may be shown as a chronologically ordered list. The travel map may be shown as a position-based graph showing a record of the user's travels. In a one illustrative embodiment, the graph may be overlaid on a map representing an area of the travel, or a map of a country, a region, or the world. The travel map may, in certain embodiments, be color-coded to represent hazard levels associated with certain locations shown.

In some embodiments, the travel map may be stored as a blockchain ledger. A blockchain may be a data structure that includes blocks of data chained (i.e., linked) to each other. Each subsequent travel event of the travel map may be recorded as a separate data block of the blockchain ledger. Storing the travel map as a sequential blockchain, in which each block builds on the information of the previous blocks, may facilitate efficient data lineage tracking and verification.

In certain embodiments, each of the data blocks of the blockchain ledger may include hashed data. A data block that is linked to a previous data block may include a hashing of hashed data of the previous data block. Each block may include data and metadata. Metadata may include a reference, or a pointer, to the previous block in the chain and a unique identifier associated with the previous block. The unique identifier may be an output of a hash function. In certain embodiments, some or all of the data and/or metadata may be encrypted. In other embodiments, some or all of the data and/or metadata may not be hashed or encrypted.

In some embodiments, the blockchain ledger may be implemented as a distributed ledger. The distributed ledger may include a plurality of nodes. Each of the plurality of nodes may include a separate computer system. Each node may store a synced copy of the blockchain ledger. The copies may, in certain embodiments, be synced via consensus. Consensus-based syncing may include only adding data blocks to the ledger when the nodes reach a consensus. The distributed ledger may use any suitable consensus algorithm such as Proof of Work, Proof of Stake, or Practical *Byzantine* Fault Tolerance. Consensus-based syncing may further contribute to the security and tamper-resistance of the system.

The distributed ledger may, in some embodiments, be a public, or unpermissioned, distributed ledger. A public distributed ledger may not have restriction on which system may participate in the establishing a consensus for adding to the record.

The distributed ledger may, in certain embodiments, be a private, or permissioned, distributed ledger. A private distributed ledger may have restrictions on which system may participate in the establishing a consensus for adding to the record.

The distributed ledger may, in some embodiments, utilize a combination of private and public participation in establishing a consensus. For example, the distributed ledger may require a threshold number of private and/or public votes, or a specific predetermined combination thereof, before recording a transaction on the distributed ledger. Utilization of private entities may allow for achieving a consensus (or rejection) of a transaction faster than wholly public distributed ledgers.

Nodes of the distributed ledger may, in certain embodiments, include entities with access to travel data of the user. For example, financial institutions with access to a financial app—through which portions of the system may run—may host one or more nodes. A central database of the entity may be a node. In some embodiments, multiple distributed systems associated with the entity may constitute multiple nodes. In certain embodiments, multiple entities may forge agreements to act as nodes of a single distributed ledger. Some nodes may also be from other, unrelated entities. For example, some nodes may be hosted by government entities with access to travel data.

In certain embodiments, the blockchain ledger may be sourced from a single trusted source of information. For example, a single entity, such as a financial institution with authority over the system. may be the trusted source. In some embodiments, the system may be implemented as a distributed ledger, and the nodes may only record data to their respective copies of the blockchain which the approval of the trusted source. The trusted source may function as a gatekeeper of the data.

The system may be configured to calculate, based at least in part on data associated with the first location and the second location, a hazard vector. A hazard vector may be a quantity with magnitude and direction. The vector may specify how much a hazard level of the user should change based on the travel event. The vector may also indicate if the hazard level should change for the positive (i.e., more hazard) or the negative (i.e., less hazard).

The system may be configured to update, based at least in part on the hazard vector, a status index associated with the user. The status index may include an overall hazard level of the user. The hazard level may be a score. The status index may be multi-dimensional. For example, the status index may include a hazard level with respect to the user. The status index may include a hazard level with respect to other parties aside from the user. The status index may include multiple hazard levels, each relating to a different party. The status index may include multiple hazard levels, each relating to a different category of hazard. For example, the status index may include a hazard level with respect to crime, a hazard level with respect to terrorism, a hazard level with respect to spread of a disease, and/or any other suitable hazard level.

The system may, in some embodiments, be further configured to provide the user and a system administrator access to the travel map and the status index. The access may be provided via an online portal. The online portal may be configured to be viewed via an application running on a computing device. The computing device may be a mobile device. For example, the user may be able to access the travel data and the status index to determine if he or she is safe to travel based on the previous travel events. An administrator may be able to access the travel data and status index to determine if the user is safe to travel, and may be able to warn the user and/or an entity that may come to harm due to a high hazard level associated with the user.

In some embodiments, sensitive information associated with the user may be tokenized in the database. Sensitive information may include a name or other identifying information. Tokenizing the data may include anonymizing the data by replacing the sensitive information with anonymous data. The anonymous data may be mapped to the sensitive information in a separate, secure, database.

The system may, in certain embodiments, further include an artificial intelligence (AI) component. The AI component may be an engine configured to calculate one or more intermediate travel events. Each intermediate travel event may be a travel event that exceeds a predetermined probability threshold of having occurred based on the travel events in the travel map. The AI component may, in some embodiments, be configured to calculate one or more future travel events. Each future travel event may be a travel event that exceeds a predetermined probability threshold of occurring in the future based on the travel events in the travel map. The system may be configured to add the intermediate travel events and/or the future travel events to the travel map.

A travel event may, in certain embodiments, include an event in which the user comes within a predetermined threshold proximity to an entity that is associated with a high hazard level. The entity may be an entity with a publicly known hazard level. The entity may be another user of the system, who may be associated in the system with a hazard level. Such an event may contribute to a positive hazard vector. A positive hazard vector may contribute to an increased hazard level reflected in the status index.

A travel event may, in some embodiments, include an event in which the first and/or second locations are on a list (e.g., a list published by a government or otherwise trusted source) of locations associated with a high hazard level. Such an event may also contribute to a positive hazard vector.

A travel event may, in certain embodiments, include an event which reflects the user being in isolation for a predetermined amount of time. Such an event may contribute to a negative hazard vector. A negative hazard vector may contribute to a decreased hazard level reflected in the status index.

In some embodiments, when the status index reflects a hazard level that exceeds a predetermined threshold, the system may be further configured to flag the user. A flag may be a mechanism employed by the system to trigger a response to the user exceeding the threshold. The flag may be internal to the system. The system may also be configured to transmit an emergency message to the user.

In certain embodiments, when the status index reflects a hazard level that exceeds a predetermined threshold, the system may be further configured to transmit an emergency message to a system administrator and/or to a related system which exceeds a threshold probability of being adversely affected by the hazard level of the user.

The system may, in some embodiments, leverage OFAC and/or AML systems as part of the calculation of a hazard vector. OFAC may refer to the Office of Foreign Assets Control of the US Department of the Treasury, which administers and enforces economic and trade sanctions based on US foreign policy and national security goals. AML may refer to anti-money laundering software that is used in the finance and legal industries to meet the legal requirements for financial institutions and other regulated entities to prevent or report money laundering activities. Leveraging such systems may present information, including financial information, which can be a factor in determining the risk associated with the user's past or future travel.

The system may, in certain embodiments, leverage medical records as part of the calculation of a hazard vector. For example, when the status index includes a hazard level with respect to an illness, medical records may be an important factor in determining a hazard vector based on the travel events. In an illustrative scenario, the medical records may indicate that the user is susceptible to altitude sickness. For such a user, when travel events indicate travel to high altitude, the system may calculate a high positive vector that may raise the hazard level of the user. The system may then send an alert to the user. The alert to the user may include useful information such as local health care facility information. The information may be tailored to the hazard level.

For example, in the illustrative scenario described above, the alert may include a list of facilities appropriate for altitude sickness.

A method for accurately and securely assembling, storing, and leveraging travel data is provided. The method may include detecting a travel event of a user. The method may include recording the travel event in a travel map that is stored in a database. The travel map may be stored as a blockchain ledger. Each travel event of the travel map may be recorded as a separate data block of the blockchain ledger.

The method may include tokenizing sensitive information associated with the user in the database. The method may include calculating, via a processor and based at least in part on data associated with the first location and the second location, a hazard vector. The method may include updating, based at least in part on the hazard vector, a status index associated with the user. The method may also include providing the user and a system administrator access to the travel map and the status index, said access being provided via an online portal configured to be viewed via an application running on a mobile device.

In certain embodiments, each of the data blocks of the blockchain ledger may include hashed data. The data blocks of the blockchain ledger may be linked. A data block that is linked to a previous data block may include a hashing of hashed data of the previous data block. The blockchain ledger may be implemented as a distributed ledger. The distributed ledger may include a plurality of nodes. Each of the nodes may store a synced copy of the blockchain ledger. The blockchain ledger may be sourced from a single trusted source of information.

The method may, in certain embodiments, include calculating, via an artificial intelligence (AI) engine, one or more intermediate travel evens. Each intermediate travel event may be a travel event that exceeds a predetermined probability threshold of having occurred based on the travel events in the travel map. The method may also include adding the one or more intermediate travel events to the travel map.

In certain embodiments, the detecting the travel events may be based at least in part on one or more input elements. Exemplary input elements may include a message transmitted by the user to the system reporting a travel event, a global positioning system (GPS) tracking system of a mobile device associated with the user, spending records of a payment instrument associated with the user, and passage of the user at a point of entry to a location. The location may, in certain embodiments, include any one of a vehicle, a building, a state, and a country.

In certain embodiments of the method, the one or more travel events may include an event in which the user comes within a predetermined threshold proximity to an entity that is associated with a high hazard level. Such an event may contribute to a positive hazard vector. A positive hazard vector may contribute to an increased hazard level reflected in the status index.

In some embodiments of the method, the one or more travel events may include an event in which the first and/or second locations are on a list of locations associated with a high hazard level. Such an event may contribute to a positive hazard vector.

In certain embodiments of the method, the one or more travel events may include an event which reflects the user being in isolation for a predetermined amount of time. Such an event may contribute to a negative hazard vector. A negative hazard vector may contribute to a decreased hazard level reflected in the status index.

In some embodiments, when the status index reflects a hazard level that exceeds a predetermined threshold, the method may further include flagging the user, and/or transmitting an emergency message to the user, to a system administrator, and/or to a related system which exceeds a threshold probability of being adversely affected by the hazard level of the user.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
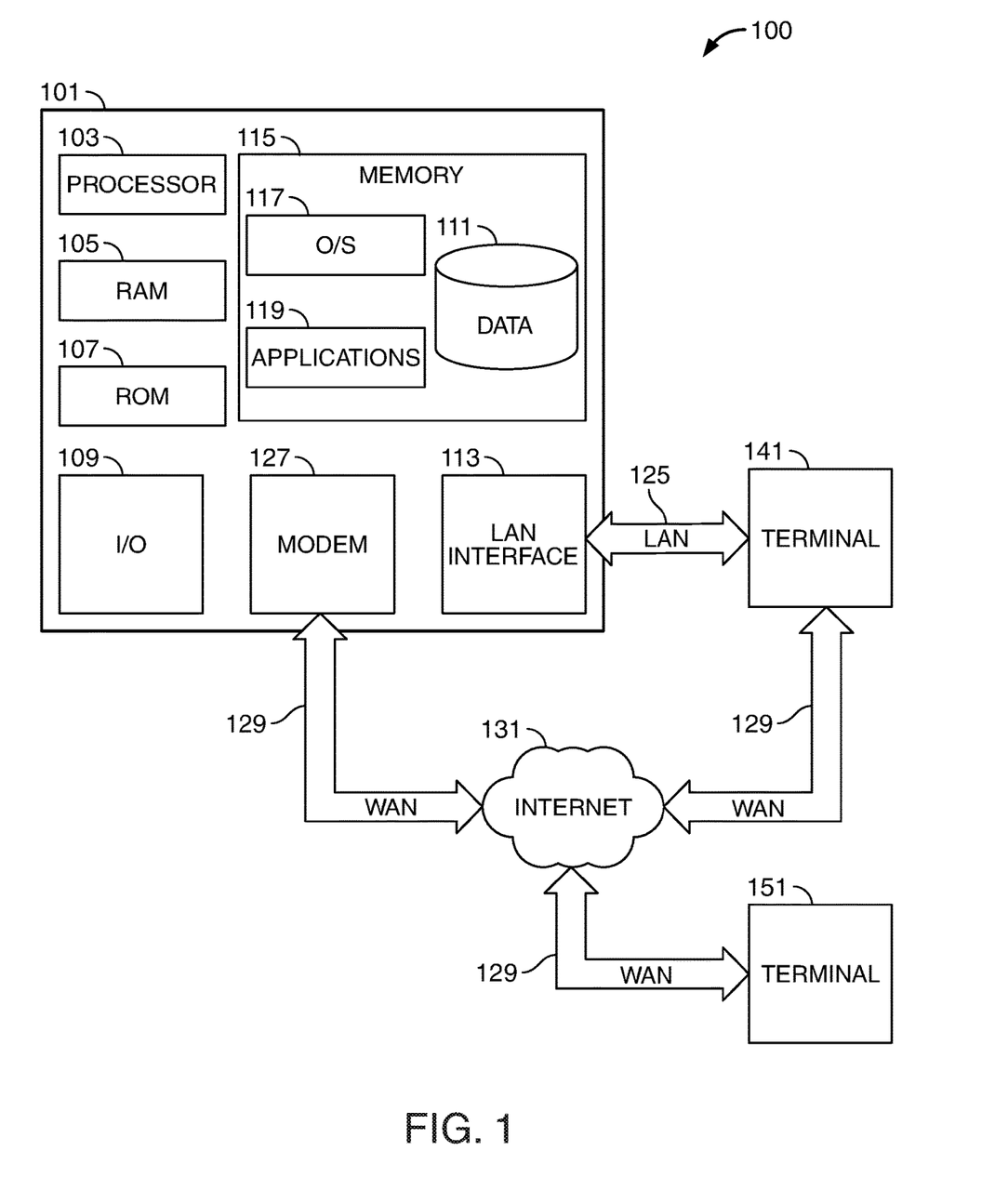
FIG. 1 shows an illustrative system in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to assembling, storing, and leveraging travel data. The input/output module may also include one or more speakers for providing audio output and a video display device for providing textual, audio, audiovisual, and/or graphical output. The input and output may be related to computer application functionality. The input and output may be related to assembling, storing, and leveraging travel data.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to assembling, storing, and leveraging travel data.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
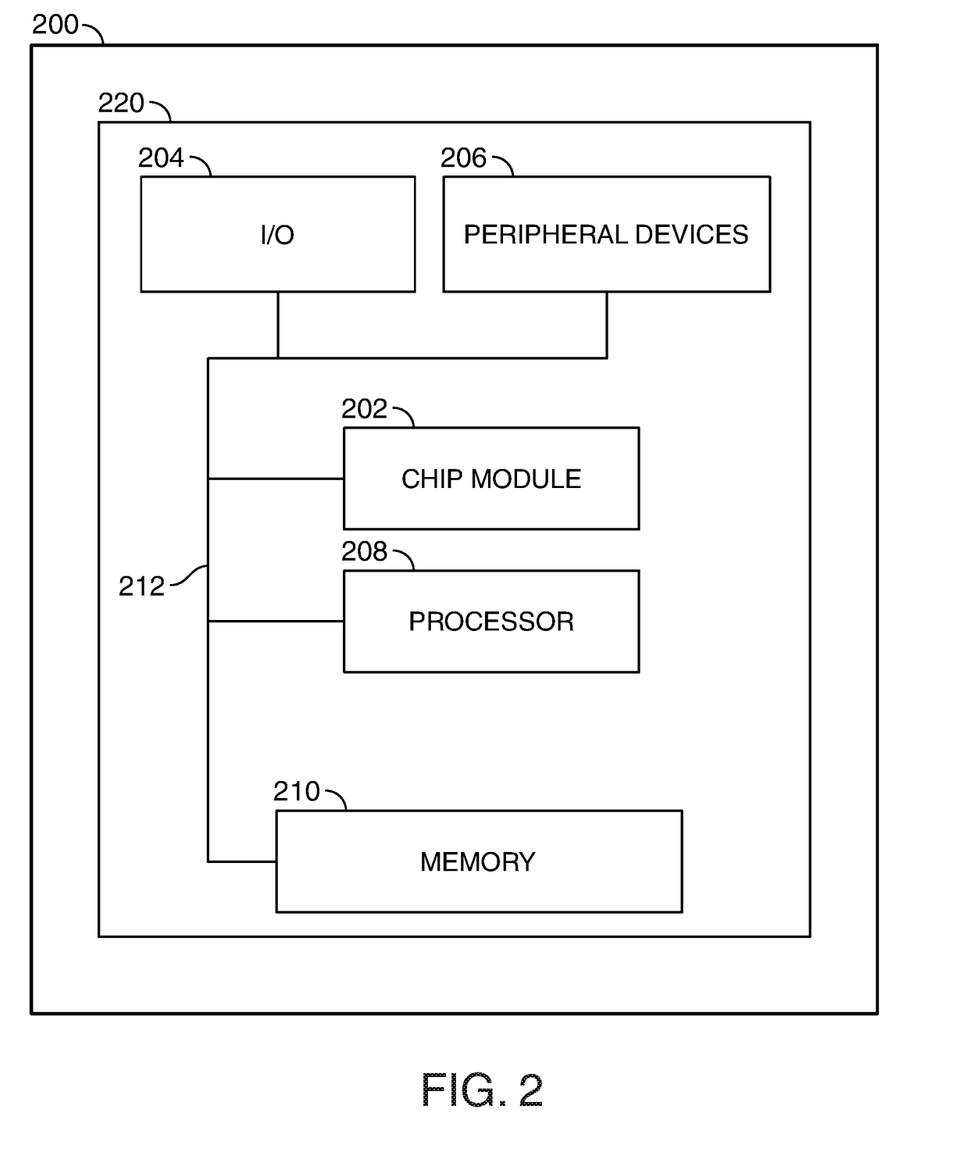
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
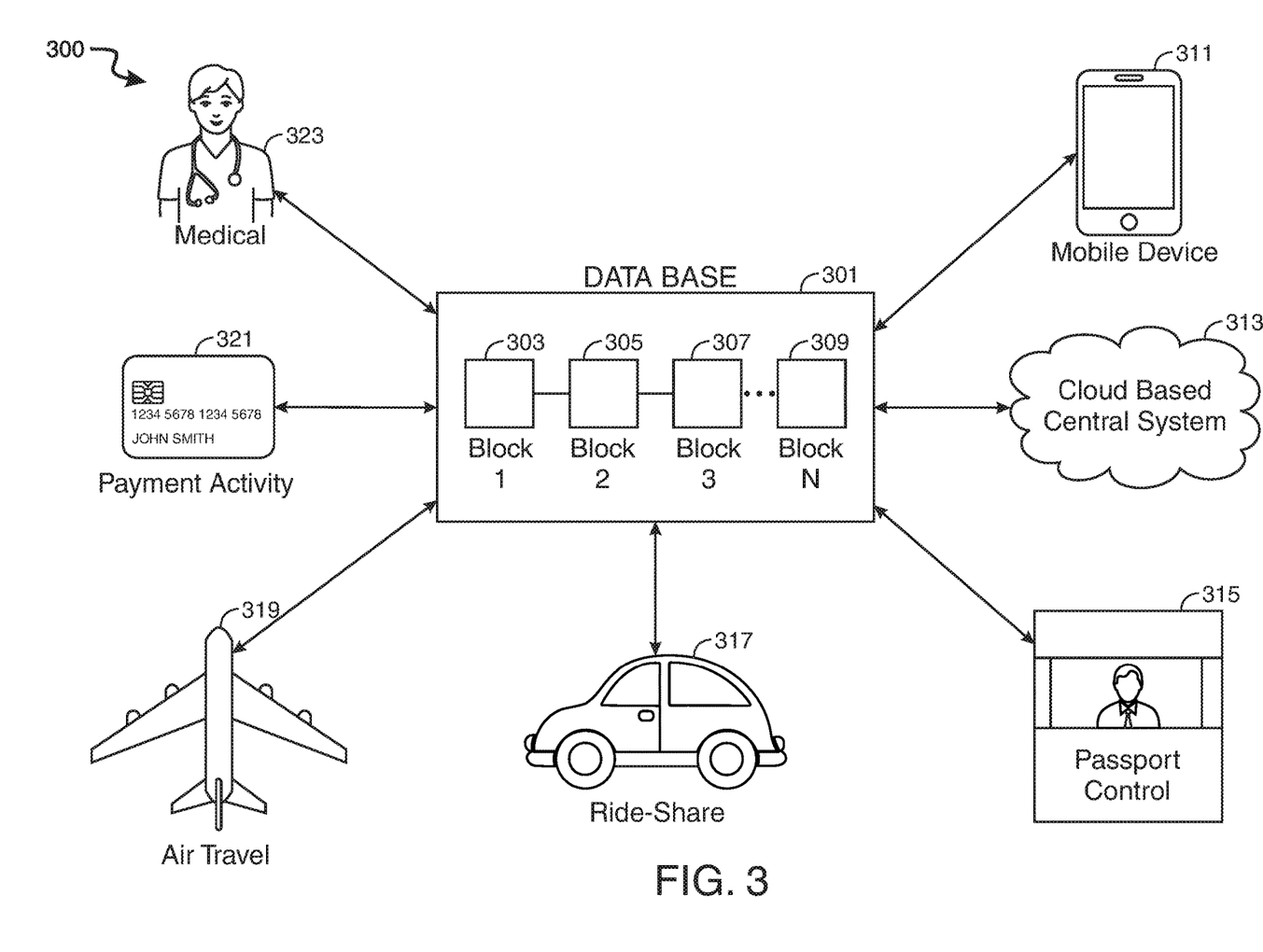
FIG. 3 shows an illustrative system diagram in accordance with principles of the disclosure.

FIG. 3 shows illustrative system diagram 300 that may be configured in accordance with the principles of the disclosure. System diagram 300 may include database 301. Database 301 may store a travel map of a user as a blockchain. The blockchain may include data blocks 303-309.

System diagram 300 may include multiple input elements coupled directly or indirectly to database 301. The input elements may detect and provide travel data, including travel events, to the system.

Input element 311 shows a mobile device. In some embodiments, the mobile device may provide input functionality such as via an app or via the GPS tracking element of the device. In certain embodiments, the mobile device may also provide a portal through which the user may access travel data, such as a travel map and/or status vector.

Input element 313 shows a central system. The central system may be cloud-based. In some embodiments, one, some, or all of the input elements may be routed through the central system before being stored in the database.

Input element 315 shows a document checkpoint. The document checkpoint may, for example, be a passport control. The document checkpoint may be at a point of entry to a location. Input element 317 shows a rideshare service. Input element 319 shows air travel. Input element 321 shows payment activity. Input element 323 shows medical records and/or activity.

Figure 4:
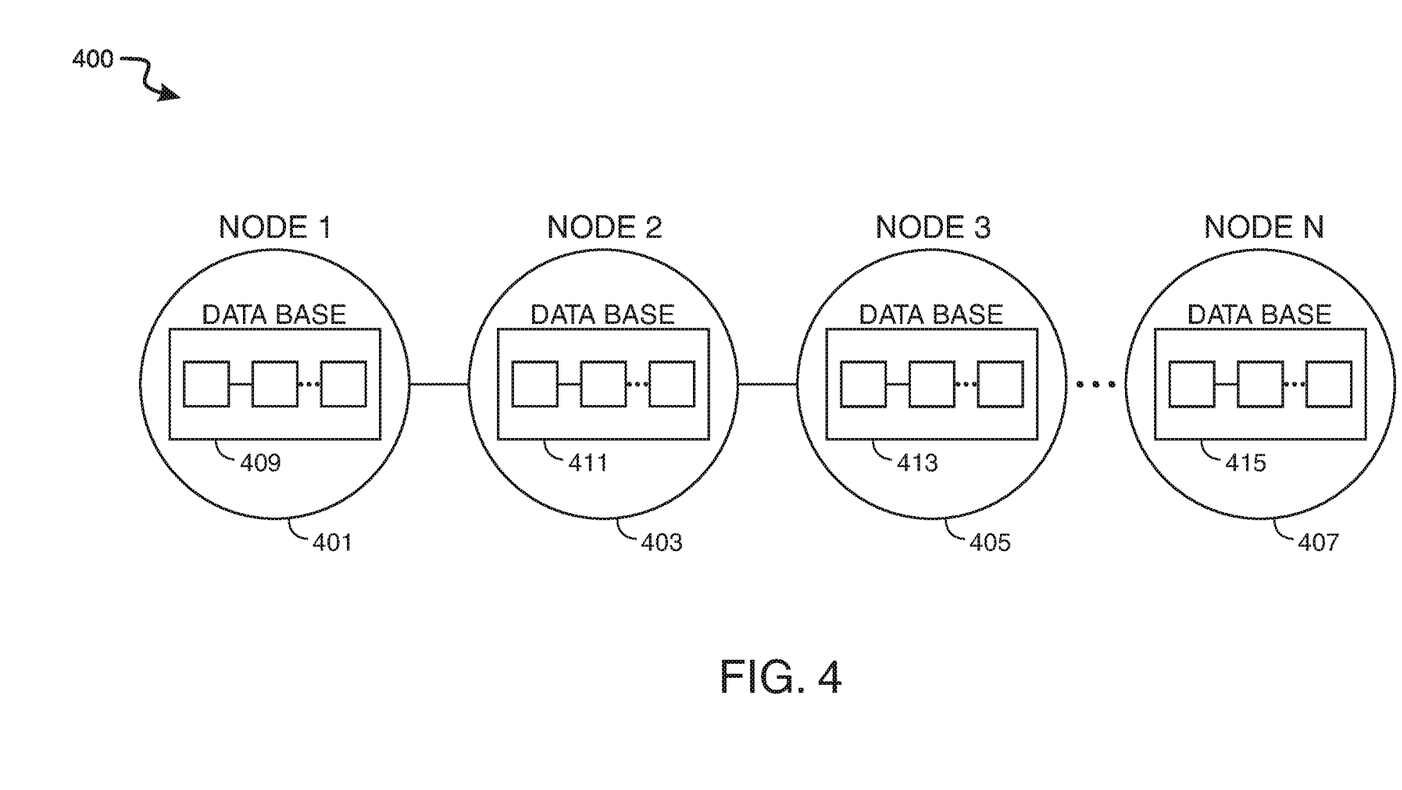
FIG. 4 shows another illustrative system diagram in accordance with principles of the disclosure.

FIG. 4 shows illustrative system diagram 400 that may be configured in accordance with the principles of the disclosure. System diagram 400 may include computer system nodes 401-407. Nodes 401-407 may store, in databases, ledgers 409-415, respectively. Ledgers 409-415 may be blockchain ledgers, and they may be synced across nodes 401-407. Nodes 401-407 may thereby be a distributed ledger system.

Figure 5:
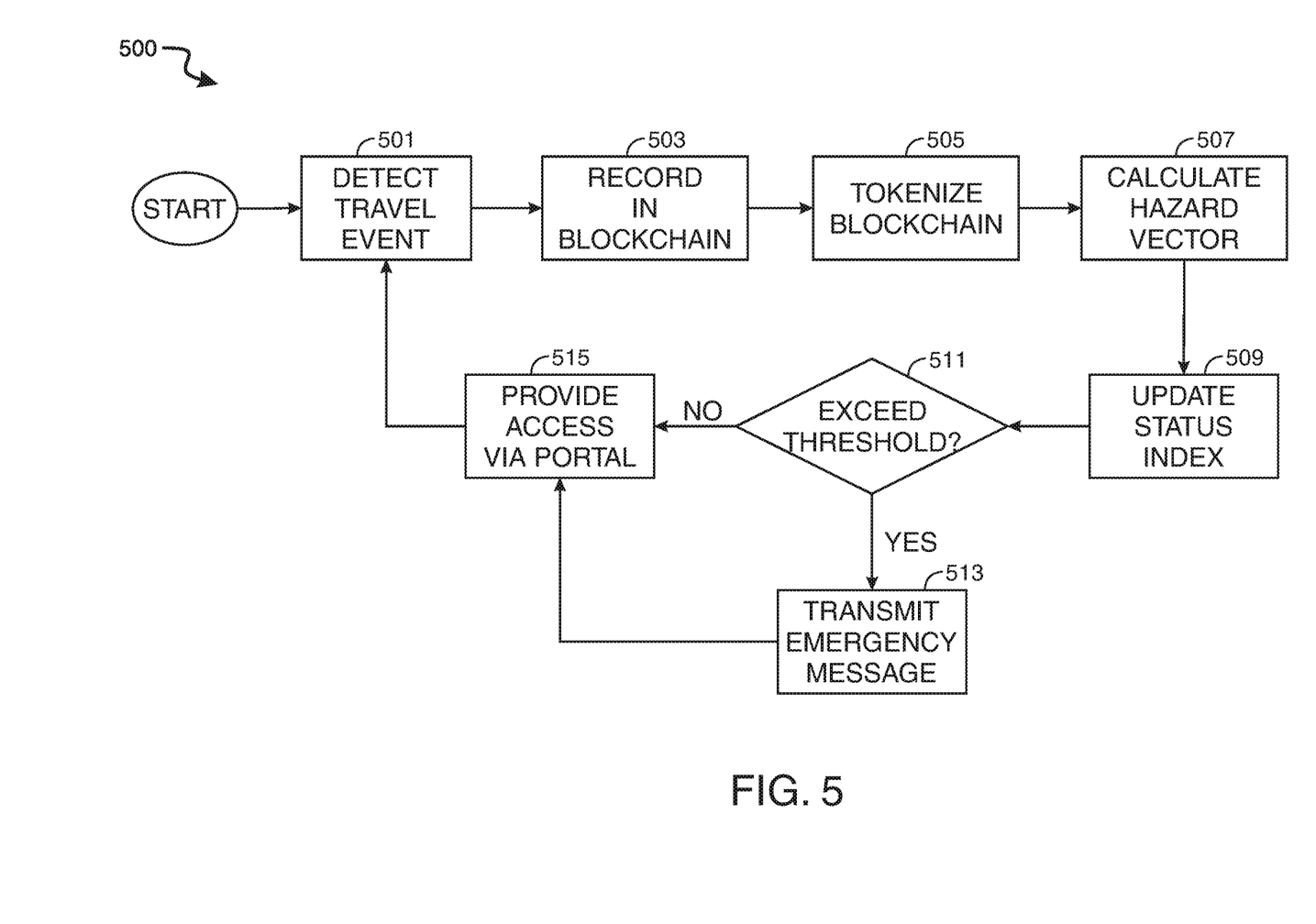
FIG. 5 shows an illustrative flowchart in accordance with principles of the disclosure.

FIG. 5 shows illustrative flowchart 500 in accordance with the principles of the disclosure. Flowchart 500 starts at step 501 with detecting a travel event. At step 503 the system may record the travel event as a blockchain. At step 505 the system may tokenize, and thereby anonymize, the blockchain. Anonymizing the blockchain may maintain privacy and security in the system. At step 507 the system may calculate a hazard vector. At step 509 the system may update a status index. At step 511 the system may check if the status index exceeds a predetermined safety threshold. If the status index does exceed the threshold, the system may execute step 513 and transmit an emergency message. If the status index does not exceed the threshold, the system may provide access to travel data via an online portal. The system may substantially continuously monitor travel activity. The system may proceed back to step 501 when another travel event is detected.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a digital passport with verified data provenance are provided. Persons skilled in the art will appreciate that the present invention can be practiced by other than the described embodiments, which are presented for purposes of illustration rather than of limitation, and that the present invention is limited only by the claims that follow.

What is claimed is:

1. A system with increased accuracy and security for assembling, storing, and leveraging travel data, the system comprising:

a processor;
a database configured to store the travel data; and
a non-transitory memory storing computer executable instructions, that when run on the processor, are configured to:
  detect a travel event of a user, said travel event comprising a transition of the user from a first location to a second location;
  record the travel event in a travel map that is stored in the database, said travel map comprising a temporal-based and spatial-based record of one or more travel events of the user, wherein said travel map is stored as a blockchain ledger, and each travel event of the travel map is recorded as a separate data block of the blockchain ledger;
  calculate, based at least in part on data associated with the first location and the second location, a hazard vector; and
  update, based at least in part on the hazard vector, a status index associated with the user;
wherein the system is further configured to provide the user and a system administrator access to the travel map and the status index, said access being provided via an online portal configured to be viewed via an application running on a mobile device.

2. The system of claim 1, wherein each of the data blocks of the blockchain ledger comprises hashed data, and the data blocks of the blockchain ledger are linked, wherein a data block that is linked to a previous data block includes a hashing of hashed data of the previous data block.

3. The system of claim 1, wherein the blockchain ledger is implemented as a distributed ledger, said distributed ledger comprising a plurality of nodes, each of said nodes storing a synced copy of the blockchain ledger.

4. The system of claim 1, wherein the blockchain ledger is sourced from a single trusted source of information.

5. The system of claim 1, wherein sensitive information associated with the user is tokenized in the database.

6. The system of claim 1, further comprising an artificial intelligence (AI) component, wherein said AI component is configured to:
  calculate one or more intermediate travel events, each intermediate travel event being a travel event that exceeds a predetermined probability threshold of having occurred based on the travel events in the travel map;
  calculate one or more future travel events, each future travel event being a travel event that exceeds a predetermined probability threshold of occurring in the future based on the travel events in the travel map; and
  add the one or more intermediate travel events and the one or more future travel events to the travel map.

7. The system of claim 1, further configured to detect the travel events based on one or more input elements, said input elements comprising:
  a message transmitted by the user to the system reporting a travel event;
  a global positioning system (GPS) tracking system of a mobile device associated with the user;
  spending records of a payment instrument associated with the user; and
  passage of the user at a point of entry to a location.

8. The system of claim 7, wherein the location comprises any one of a vehicle, a building, a state, and a country.

9. The system of claim 1, wherein the travel event comprises an event in which the user comes within a predetermined threshold proximity to an entity that is associated with a high hazard level, wherein said event contributes to a positive hazard vector, said positive hazard vector which contributes to an increased hazard level reflected in the status index.

10. The system of claim 1, wherein the travel event comprises an event in which the first and/or second locations are on a list of locations associated with a high hazard level, wherein said event contributes to a positive hazard vector, said positive hazard vector which contributes to an increased hazard level reflected in the status index.

11. The system of claim 1, wherein the travel event comprises an event which reflects the user being in isolation for a predetermined amount of time, wherein said event contributes to a negative hazard vector, said negative hazard vector which contributes to a decreased hazard level reflected in the status index.

12. The system of claim 1, wherein, when the status index reflects a hazard level that exceeds a predetermined threshold, the system is further configured to flag the user and transmit an emergency message to the user.

13. The system of claim 1, wherein, when the status index reflects a hazard level that exceeds a predetermined threshold, the system is further configured to flag the user and transmit an emergency message to a system administrator and to a related system which exceeds a threshold probability of being adversely affected by the hazard level of the user.

14. A method for accurately and securely assembling, storing, and leveraging travel data, the method comprising:
  detecting a travel event of a user, said travel event comprising a transition of the user from a first location to a second location;
  recording the travel event in a travel map that is stored in a database, said travel map comprising a temporal-based and spatial-based record of one or more travel events of the user, wherein said travel map is stored as a blockchain ledger, and each travel event of the travel map is recorded as a separate data block of the blockchain ledger;
  tokenizing sensitive information associated with the user in the database;
  calculating, via a processor and based at least in part on data associated with the first location and the second location, a hazard vector;
  updating, based at least in part on the hazard vector, a status index associated with the user; and
  providing the user and a system administrator access to the travel map and the status index, said access being provided via an online portal configured to be viewed via an application running on a mobile device.

15. The method of claim 14, wherein:
each of the data blocks of the blockchain ledger comprises hashed data, and the data blocks of the blockchain ledger are linked, wherein a data block that is linked to a previous data block includes a hashing of hashed data of the previous data block;
the blockchain ledger is implemented as a distributed ledger, said distributed ledger comprising a plurality of nodes, each of said nodes storing a synced copy of the blockchain ledger; and
the blockchain ledger is sourced from a single trusted source of information.

16. The method of claim 14, further comprising:
calculating, via an artificial intelligence (AI) engine, one or more intermediate travel events, each intermediate travel event being a travel event that exceeds a predetermined probability threshold of having occurred based on the travel events in the travel map;

calculating, via the AI engine, one or more future travel events, each future travel event being a travel event that exceeds a predetermined probability threshold of occurring in the future based on the travel events in the travel map; and adding the one or more intermediate travel events and the one or more future travel events to the travel map.

17. The method of claim 14, wherein the detecting the travel events is based at least in part on one or more input elements, said input elements comprising:

a message transmitted by the user to the system reporting a travel event;

a global positioning system (GPS) tracking system of a mobile device associated with the user;

spending records of a payment instrument associated with the user; and passage of the user at a point of entry to a location, the location comprising any one of a vehicle, a building, a state, and a country.

18. The method of claim 14, wherein the one or more travel events comprise one or more of:

an event in which the user comes within a predetermined threshold proximity to an entity that is associated with a high hazard level, wherein said event contributes to a positive hazard vector, said positive hazard vector which contributes to an increased hazard level reflected in the status index;

an event in which the first and/or second locations are on a list of locations associated with a high hazard level, wherein said event contributes to a positive hazard vector, said positive hazard vector which contributes to an increased hazard level reflected in the status index; and an event which reflects the user being in isolation for a predetermined amount of time, wherein said event contributes to a negative hazard vector, said negative hazard vector which contributes to a decreased hazard level reflected in the status index.

19. The method of claim 14, wherein, when the status index reflects a hazard level that exceeds a predetermined threshold, the method further comprises flagging the user, and transmitting an emergency message to the user, to a system administrator, and to a related system which exceeds a threshold probability of being adversely affected by the hazard level of the user.

20. A system with increased accuracy and security for assembling, storing, and leveraging travel data, the system comprising:

a processor;

a database configured to store the travel data; and a non-transitory memory storing computer executable instructions, that when run on the processor, are configured to:

detect a travel event of a user, said travel event comprising a transition of the user from a first location to a second location;

record the travel event in a travel map that is stored in the database, said travel map comprising a temporal-based and spatial-based record of one or more travel events of the user, wherein said travel map is stored as a blockchain ledger, and each travel event of the travel map is recorded as a separate data block of the blockchain ledger;

calculate, based at least in part on data associated with the first location and the second location, a hazard vector; and update, based at least in part on the hazard vector, a status index associated with the user;

wherein the system further comprises an artificial intelligence (AI) component that is configured to:

calculate one or more intermediate travel events, each intermediate travel event being a travel event that exceeds a predetermined probability threshold of having occurred based on the travel events in the travel map;

calculate one or more future travel events, each future travel event being a travel event that exceeds a predetermined probability threshold of occurring in the future based on the travel events in the travel map; and add the one or more intermediate travel events and the one or more future travel events to the travel map.

* * * * *